United States Patent
Palviainen et al.

[19]

[11] Patent Number: 5,950,126
[45] Date of Patent: Sep. 7, 1999

[54] NETWORK OPERATOR CONTROLLED USAGE OF LONG DISTANCE CARRIERS

[75] Inventors: Keijo Palviainen, Helsinki; Lauri Lahtinen, Espoo, both of Finland

[73] Assignee: Nokia Telecommunications Oy, Espoo, Finland

[21] Appl. No.: 08/760,160

[22] Filed: Dec. 3, 1996

[51] Int. Cl.$^6$ ..................................................... H04Q 7/34
[52] U.S. Cl. ........................... 455/423; 455/445; 455/432
[58] Field of Search ..................... 455/423, 445, 455/432, 415; 379/120, 91.01

[56] References Cited

U.S. PATENT DOCUMENTS

| | | |
|---|---|---|
| 4,791,665 | 12/1988 | Bogart et al. . |
| 4,908,848 | 3/1990 | Jordan et al. ............................ 455/565 |
| 5,022,067 | 6/1991 | Hughes . |
| 5,222,125 | 6/1993 | Creswell et al. . |
| 5,418,844 | 5/1995 | Morrisey et al. ........................ 379/207 |
| 5,436,957 | 7/1995 | McConnell . |
| 5,475,746 | 12/1995 | Miller et al. . |
| 5,524,146 | 6/1996 | Morrisey et al. . |
| 5,550,910 | 8/1996 | DeJager . |
| 5,550,915 | 8/1996 | Partridge, III . |
| 5,553,129 | 9/1996 | Partridge, III . |
| 5,563,939 | 10/1996 | La Porta et al. . |
| 5,606,595 | 2/1997 | Ejzak ....................................... 370/349 |
| 5,621,787 | 4/1997 | McKoy et al. . |
| 5,627,887 | 5/1997 | Freedman . |
| 5,633,914 | 5/1997 | Rosa . |
| 5,668,955 | 9/1997 | Deciutiis et al. . |
| 5,694,461 | 12/1997 | Lee ......................................... 379/196 |
| 5,715,299 | 2/1998 | Mosley et al. . |
| 5,724,658 | 3/1998 | Hasan . |
| 5,742,905 | 4/1998 | Pepe et al. . |
| 5,748,717 | 5/1998 | Chan et al. . |

FOREIGN PATENT DOCUMENTS

| | | |
|---|---|---|
| 0 438 860 | 7/1991 | European Pat. Off. . |
| WO 95/01688 | 1/1995 | WIPO . |
| WO 95/21509 | 8/1995 | WIPO . |

*Primary Examiner*—Curtis A. Kuntz
*Assistant Examiner*—Linwood C. Scott, Jr.
*Attorney, Agent, or Firm*—Pillsbury Madison & Sutro LLP

[57] ABSTRACT

In order to to enable an operator to control the subscriber's long distance carrier usage in a telecommunications network, a new subscriber-specific parameter, a locking parameter, is added to the subscriber data by the operator, in addition to a preferred long distance carrier access code. The locking parameter defines whether said subscriber is allowed to select the long distance carrier for the call or not. The locking parameter is checked each time the subscriber dials the long distance carrier access code during an originating call setup. In an embodiment of the invention, if the locking parameter indicates the subscriber is not allowed to select the long distance carrier, the call setup will be always terminated, preferably after making an announcement for informing the subscriber of the cause of the termination.

27 Claims, 5 Drawing Sheets

| IMSI | | |
|---|---|---|
| PRIMARY LINE | | |
| BASIC SERVICE CODE 1 = TELEPHONY (T11) | MSISDN-1 | PIC-1 | PICLOCK-1 |
| BASIC SERVICE CODE 2 = C.D.A 9600 BIT/S (B16) | MSISDN-2 | | |
| BASIC SERVICE CODE 3 = FACSIMILE (T62) | MSISDN-3 | | |
| SECONDARY LINE | | |
| BASIC SERVICE CODE = ALTERNATIVE LINE (TD0) | MSISDN-4 | PIC-2 | PICLOCK-2 |

*FIG. 2A*

| IMSI | | |
|---|---|---|
| PRIMARY LINE | | |
| BASIC SERVICE CODE 1 = TELEPHONY (T11) | MSISDN-1 | PIC-1 | PICLOCK-11 |
| BASIC SERVICE CODE 2 = C.D.A 9600 BIT/S (B16) | MSISDN-2 | | PICLOCK-12 |
| BASIC SERVICE CODE 3 = FACSIMILE (T62) | MSISDN-3 | | PICLOCK-13 |
| SECONDARY LINE | | |
| BASIC SERVICE CODE = ALTERNATIVE LINE (TD0) | MSISDN-4 | PIC-2 | PICLOCK-2 |

*FIG. 2B*

| PLMN | DEFAULT PIC | PIC RELATION | DEFAULT PICLOCK | PICLOCK RELATION |
|---|---|---|---|---|
| PCN 1 | CIC 1 | 1 | ON | 1 |
| PCN 2 | CIC 1 | 3 | OFF | 3 |
| PCN 3 | CIC N | 1 | ON | 1 |

NETWORK OPERATOR CONTROLLED USAGE OF LONG DISTANCE CARRIERS

FIELD OF THE INVENTION

The invention relates to telecommunications networks, in which subscribers are allowed to select a long distance carrier for a call.

BACKGROUND OF THE INVENTION

It is typical for modern communications systems that there are multiple network operators or service providers. For example there may one or more local telephone networks and operators in each city. Similarly, there may be several long distance networks or carriers for making long distance calls between the local telephone networks or for making international calls. A user has normally a subscription to one of the local telephone networks, but is able to select a long distance carrier on a call by call basis, by dialing a predetermined access code or prefix. In the USA, for example, there is a feature called Equal Access which provides a way for the subscriber to select whatever long distance carrier he/she wants to use when making long distance or international calls. Each long distance carrier is uniquely identified by a digital code called the Carrier Identification Code (CIC), according to the North American Numbering Plan (NAMP). The user dials the CIC by means of an other digital code, called Carrier Access Code (CAC). The CAC sequence is of the form 10xxx, where XXX is the 3-digit CIC and 10 is the prefix indicating that CIC will be following. In near future the CIC will be extended to a 4-digit code and the prefix will then be 101, the CAC being then 101XXXX.

In the USA there is under development the Personal Communications System (PCS) 1900 which is a wireless cellular network based on the European digital mobile communication system GSM (Global System for Mobile Communications). When implementing the Equal Access feature in the PCS, a Preferred Carrier Id (PIC) is added to the subscriber profile, i.e to the subscriber data stored in the subscriber data base (HLR) which is normally used. The long distance call is then as a default rule routed to the long distance carrier indicated by the PIC. The PIC will also apply in the case of call forwarding. The forwarded leg of the call will be routed by using the PIC. During location update procedure, for example, the PIC is transferred to the visited subscriber data base (VLR). The PIC is then used when the subscriber make calls while roaming. If the subscriber wants to use other than the preferred carrier, he/she can override the preferred carrier by dialing the CAC before the destination number (B-number).

This so called "casual dialling" may cause problems to the operator of the local network, if the operator should know exactly the total cost of the calls. The operator may, for example, have service packages where it is needed that the long distance carrier be known by the operator. Such service may be, for example, a prepaid subscription, i.e. the subscriber has paid for the usage of the service in advance. Since, normally the charging of the long distance carrier is independent from that of the local operator, the operator should exactly know the long distance carrier and the charging thereof, in order to be able to monitor the usage of the prepaid fund. In many cases, the companies pay the usage of the mobile phones of their employees. If the company has a deal with one of the long distance operators for a special rate, the casual dialling which allows the user to select any of the long distance carriers may cause extra costs to the company. Therefore, there is a need to control the casual dialling and the selection of the long distance carriers for the calls.

SUMMARY OF THE INVENTION

An object of the invention is to enable the operator to control the subscriber's long distance carrier usage.

A new subscriber-specific parameter, a locking parameter, is added to the subscriber data by the operator, in addition to the preferred long distance carrier access code. The locking parameter defines whether the subscriber is allowed to select the long distance carrier for the call or not. The locking parameter is checked each time the subscriber dials the long distance carrier access code during an originating call setup. In an embodiment of the invention, if the locking parameter indicates the subscriber is not allowed to select the long distance carrier, the call setup will be always terminated, preferably after making an announcement for informing the subscriber of the cause of the termination. In another embodiment of the invention, if the locking parameter indicates the subscriber is not allowed to select the long distance carrier, the call setup will be continued only when the dialled and preferred long distance access codes do match. In both of the above embodiments, the long distance call will be made using the preferred long distance carrier access code, if only a destination number with no long distance carrier access code is dialled by the subscriber. By means of the locking parameter, the operator is able to selectively lock any subscriber to use the preferred long distance carrier so that the choice of another carrier by subscriber can not override the preferred carrier by making the casual dialling.

When the subscriber is roaming, the preferred carrier information, i.e. the preferred carrier access code and the locking parameter of the subscriber, is transferred to a subscriber data base of visited network, for example with other subscriber data during a standard location update procedure. If the visited network supports the feature, the preferred carrier access code and the locking parameter may be used in a similar manner as in the home network.

In some cases, the preferred carrier information of the roaming subscriber may not be available in the visited network. This may occur, for example, when the home network of the roaming subscriber is not supporting the feature, or when the preferred carrier information is not transferred for some reason, such as inter-operator agreements. However, the operator of the visited network may wish to control the long distance carrier usage of the roaming subscribers. According to a still further embodiment of the invention, the visited operator assigns a default preferred long distance carrier access code for a home network whose subscribers roaming in the visited network. In the absence of the subscriber's preferred carrier information, this network-specific default may be used instead.

In still another embodiment of the invention, the network-specific default may override the subscriber's preferred carrier information, although the latter is available. The visited operator may assign to a home network a new network-specific parameter, a preferred carrier relation parameter, which controls the selection between the subscriber's preferred carrier access code and the network default. The preferred carrier relation parameter may, for example, indicate one of the following alternatives to handle subscribers roaming from a specific network: 1) use the subscriber's preferred carrier access code, if available, 2)

use the subscriber's preferred carrier access code only, 3) use the network default only.

In a still further embodiment of the invention, the visited operator may assign to a home network a default locking parameter. In absence of the subscriber's locking parameter, this network-specific default may be used instead. In still another embodiment of the invention the network-specific default may override the subscriber's locking parameter information, although the latter is available. The visited operator may assign to a home network a new network-specific parameter, a locking relation parameter, which controls the selection between the subscriber's locking parameter and the network default. The locking relation parameter may, for example, indicate one of the following alternatives to handle subscribers roaming from a specific network: 1) use the subscriber's locking parameter only, or 2) use the network default only.

The inventive parametrization allows the visited operator to control in different way subscribers from different networks, based on the agreement between the operators, for example. The default parameters can be used to control subscribers from a network which does not support the inventive long distance carrier locking feature. The invention also allows an operator to control different way those subscribers of a specific network who does not have the preferred carrier code (old subscribers) and/or the locking parameter, and those who have (new subscribers). The inventive relation parameters may control the former subscriber's to use the network defaults and the latter subscriber's to use the subscriber's own parameters. The operator may utilize the network-specific parametrization also to its own subscribers, if desired. The default preferred carrier access code and/or the locking relation parameter will then be assigned also the operator's own network. This can be applied particularly well to a network having a home subscriber database and (a) visitor subscriber database(s), such as HLR and VLR in the PCS and GSM systems.

Each subscriber may have one or multiple locking parameters. For example, different tele and/or bearer services of the subscriber, such as speech and data, may have dedicated locking parameters. This approach enables an operator to lock the long distance carrier for data calls but allows the user to practice casual dialling for other types of calls.

The invention may be applied also in call-forwarding activations to reject to allow a long distance carrier access code in the forwarded-to-number inputted by the subscriber.

BRIEF DESCRIPTION OF THE DRAWINGS

Other objects, features and advantages of the invention will become evident in light of the following description made with reference to the attached drawings, in which:

FIG. 2A shows a subscriber profile in the subscriber database HLR according to the first embodiment of the invention, FIG. 2B shows a subscriber profile in the subscriber database HLR according to the second embodiment of the invention.

DETAILED DESCRIPTION OF PREFERRED EMBODIMENTS OF THE INVENTION

The present invention is particularly applicable in wireless communication systems but it may as well be applied in fixed networks, such as ISDN (Integrated Services Digital Network) or PSTN (Public Switched Telephone Network), for providing the network operator with means for controlling the long distance carrier selection made by individual subscribers. In the fixed networks, the invention is particularly applicable for controlling the subscribers of the PABXs (private automatic branch exchange) in the long distance carrier selection. The PABX maybe a wired or wireless PABX.

The type of the long distance network or carrier is not relevant to the present invention. The countries in the Northern America, whose country code is "1", are called commonly World Zone 1. This includes the OSA, Canada and some smaller countries. A long distance network or carrier authorized to provide interexchange communications between local telephone networks within World Zone 1 is called an interexchange carrier (IXC). A long distance network or carrier authorized provide interexchange telecommunications services outside World Zone 1 using international dialling plan, is called an international carrier (INC). A common term, a long distance carrier, will be used to refer both the IXC and INC in the following description. In other countries there maybe different terminology in use for the interexchange and international carriers.

Examples of the wireless communications systems are the GSM system, UMTS (Universal Mobile Communication System) and PCS (Personal Communication System). In the following the invention will be described with reference to PCS 1900 network. As noted above, the PCS is based on GSM system, and therefore, the operation and structure of the network is quite similar to GSM. The basic structure and basic operation of the GSM mobile radio system are well known by a person skilled in the art and detail defined in the GSM specifications of the international telecommunications standard institute (ETSI). For detail description of the GSM system, a reference is made to the GSM specifications and to the book "the GSM system for mobile communications" M. Mouly and M. Pautet, Palaiseau, France.

Figure 1:
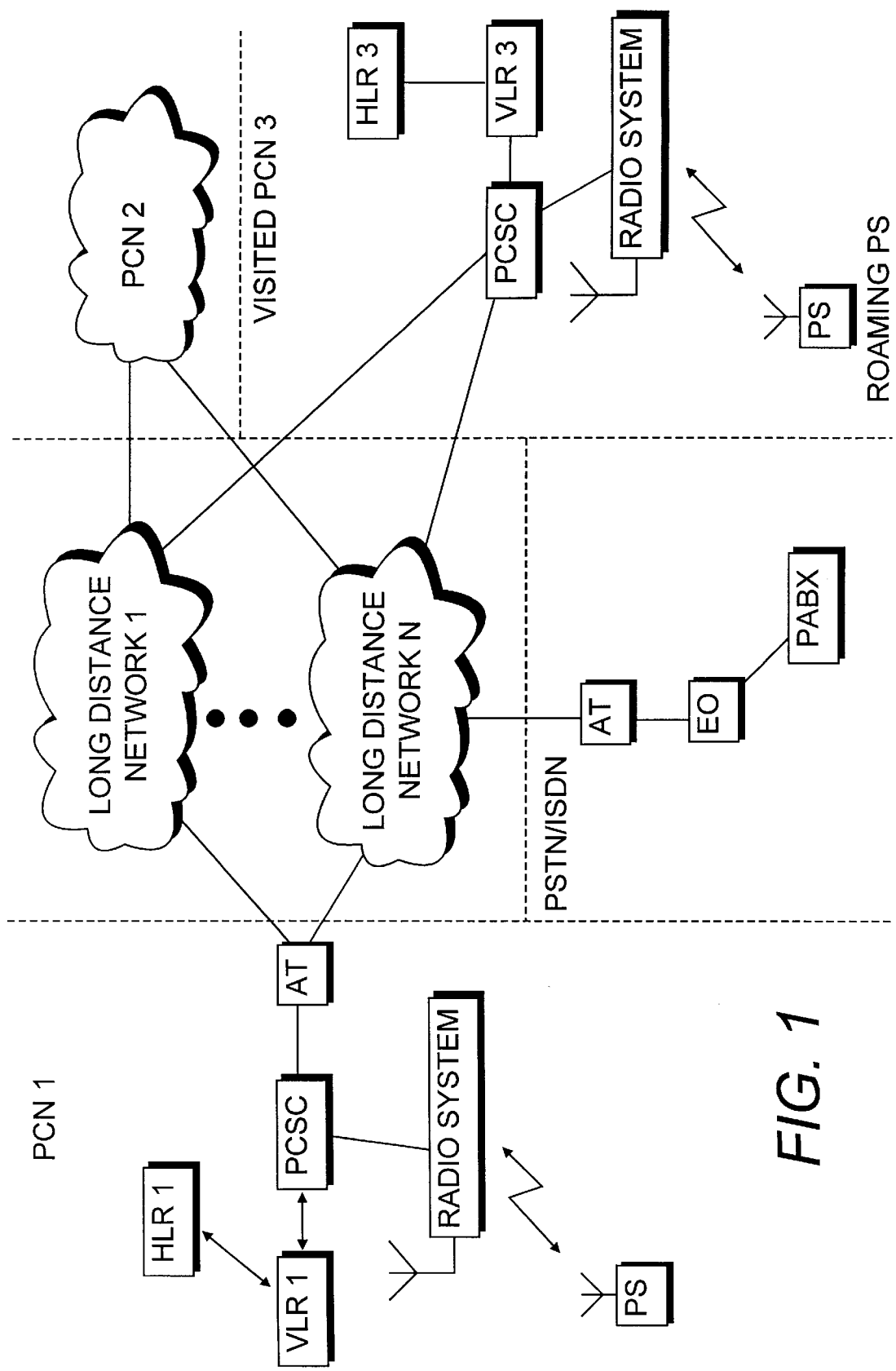
FIG. 1 illustrates a telecommunications system comprising wireless networks PC1–3, a local PSTN network, and long distance networks 1 . . . N.

In FIG. 1, there are shown personal communication networks PCN1, PCN2, and PCN3 which are wireless local networks, and a local PSTN as well as long distance networks 1 . . . N.

In PCN1, a personal services switching center PCSC (a mobile services switching center MSC in the GSM system) switches incoming and outcoming calls. The functions of the PCSC are partly similar to those of the end office EO (an exchange) in the PSTN. In addition, the PCSC has functions typical to only mobile communications, such as subscriber location management, paging, out identication, etc. Personal stations PS (mobile radio stations MS in the GSM system) are connected to the PCSC by means of radio systems RA (basestation systems BSS in the GSM system). The radio system RA comprises base stations in the PCS system, and a base station controller BSC and base stations BTS in the GSM system. The operation or structure of the radio system RA is not significant in the present invention point of view, and they will not be described more detailly herein.

Subscriber data, such as location data, are stored permanently in a home location resistor HLR. The HLR also contains the user profiles. The PCN1 comprises one or more visitor location registers VLR, each being associated with one or more PCSC area. The VLR is a data base in which subscriber data, i.e. the copies of the original user profile, as stored while the PS is visiting the area of the PCSC.

The two other wireless networks, PCN2 and PCN3, comprise respective network elements.

In FIG. 1, the PCSC are gateway-PCSCs which provide the interworking functions with other networks, such as long distance networks 1 . . . n and a local PSTN. The gateway PCSC may be, for example, a PCSC which is connected to the other networks via access tandems AT.

The equal access is normally embodied in the PCN by introducing the preferred interexchange carrier PIC into the subscriber profile in the HLR and the VLR, as described above with the reference to the prior art systems. However, there is no means for the operator of the PCN to control which long distance carrier is selected by the subscriber in the equal access. In the following, various embodiments of the invention for enabling this operator's control will be explained in detail.

FIGS. 2A and 2B illustrate first and second embodiments of the PCS subscriber profile according to the invention in the subscriber database HLR. In the subscriber profile shown in FIG. 2A, there are three basic services for the primary line, each basic service having a dedicated direction number MSISDN. The three basic services are assigned a common PIC-1 in accordance with the equal access concept. In accordance with the present invention, a new parameter, PICLOCK, is introduced into the subscriber's profile in the HLR. The value of parameter PICLOCK is either on or off, indicating whether a subscriber is allowed to use casual dialling for selecting the long distance carrier for a call, or not. In the embodiment of the FIG. 2, one IMSI (International mobile subscriber identity) is associated with one PICLOCK parameter, namely PICLOCK-1, except if the IMSI has also an alternate line service ALS, currently preferred as dual numbering. In FIG. 2, the seconday line is assigned a dedicated PIC and a dedicated PICLOCK parameter. The PICLOCK value is decided by the operator or by the in the subscription agreement. The PICLOCK value is always set by the operator. If the subscriber wishes to change the PICLOCK value, he/she has to request the change from the operator, who will check whether the subscriber is authorized to change the parameter value or not.

In another embodiment of the invention, shown in FIG. 2B, a dedicated PICLOCK parameter is assigned to each bearer teleservice, having a dedicated MSISDN (of the subscriber.) For example in FIG. 2B, telephony, data and facsimile services are assigned dedicated directory numbers MSISDN-1, MSISDN-2, and MSISDN-3, a common PIC parameter PIC-1, and dedicated PICLOCK parameters PICLOCK-11, PICLOCK-12 and PICLOCK-13, respectively. This approach allows the operator to control the use of long distance carriers in different services independently of each other. For example, the telephony services (the basic service code 1) and facsimile services (basic service code 3); may have the PICLOCK parameter on, and the data service (basic service code 2) may have the PICLOCK parameter off. As an further alternative to the embodiment of FIG. 2B, each service may have a dedicated PIC parameter.

Figures 3, 6:
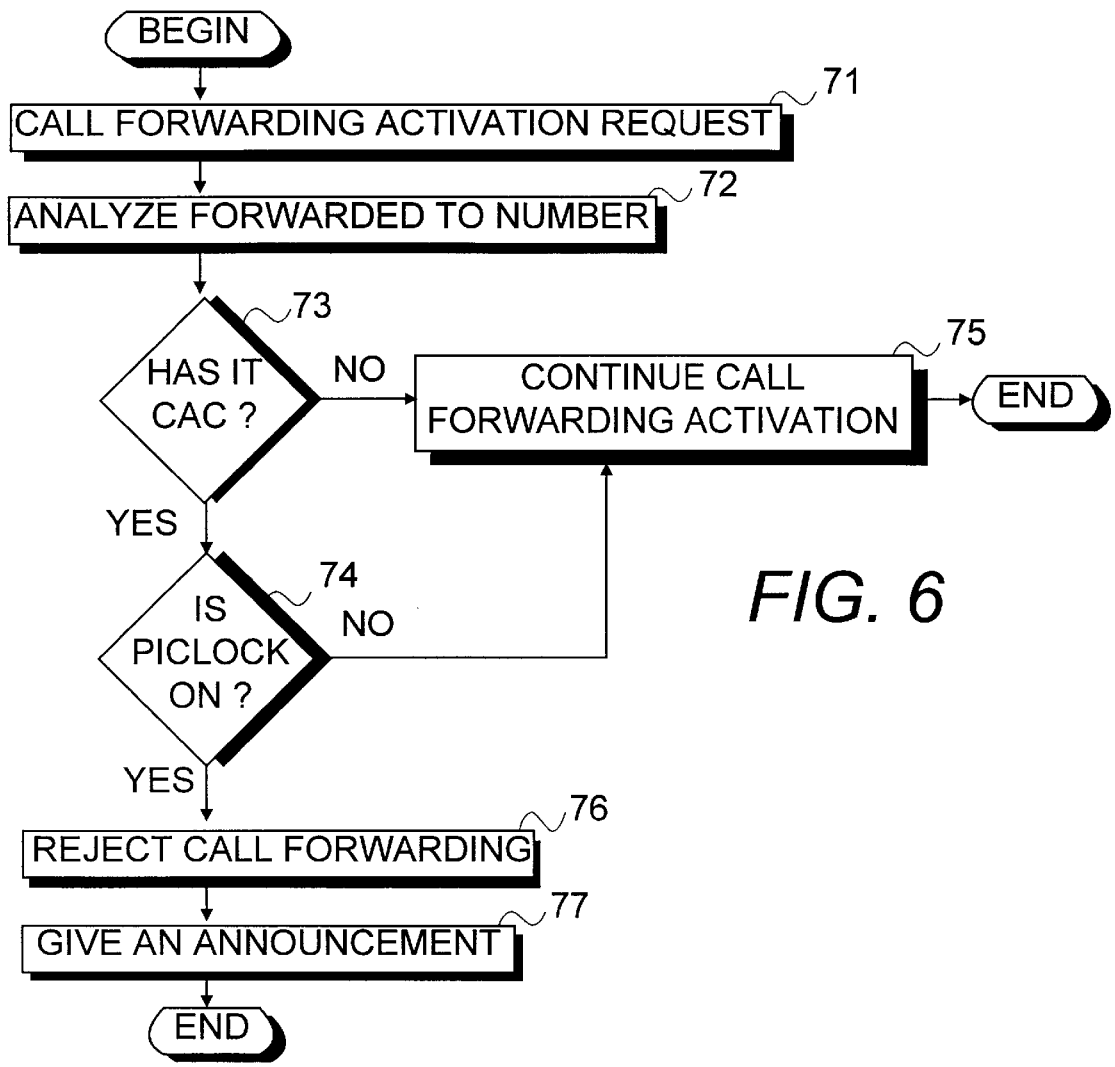
FIG. 3 shows an extension to the personal communication network PCN basis information existing in the visitor location register VLR.
FIG. 6 is a flow diagram illustrating the operation of the subscriber database HLR during a call forwarding activation according to the present invention.

FIG. 3 illustrates for new parameters according to a present invention, in the PCN basis, information existing in the visitor location register VRL. While the mobile subscriber makes a location updating, the IMSI is mapped to one of the PCNs, which is called the home PCN of the subscriber. Each "home PCN" is assigned a default PIC, PIC relation, default PICLOCK, and PICLOCK relation parameters. In the VRL of the visited PCN, the default PIC defines a default preferred long distance carrier access code (CAC) for the home-PCN by storing only the carrier access code (CIC) part of CAC.

The PIC-relation parameter defines whether the subscriber's PIC received from the home PCN, or the home-PCN's default PIC, is used. The PIC relation parameter made, for example, indicate one of the following alternatives to handle a subscriber's roaming from a specific home PCN: 1) use the subscriber's PIC, if available, 2) use the subscriber's PIC only, 3) use the network default PIC only.

A default PICLOCK defines whether the subscribers of the specific home PCN are allowed to use a casual dialling, or not, as a default. The PICLOCK relation parameter defines whether the subscribers PICLOCK received from the home PCN, of the home PCN's default PICLOCK, is used. The PICLOCK relation parameter may, for example, indicate one of the following alternatives to handle subscriber's roaming from a specific home PCN: 1) use the subscriber's PICLOCK only, 2) use the network default PICLOCK only. The network specific parameters described above maybe assigned also for networks own subscribers, in addition to a visiting subscribers. It should be also noted that default PIC and PIC relation parameters are independent from the default PICLOCK and PICLOCK parameters. It is also possible that only default PICLOCK and PICLOCK parameters are used, or even that only default PICLOCK parameters are used for controlling the visiting subscribers.

Figure 4:
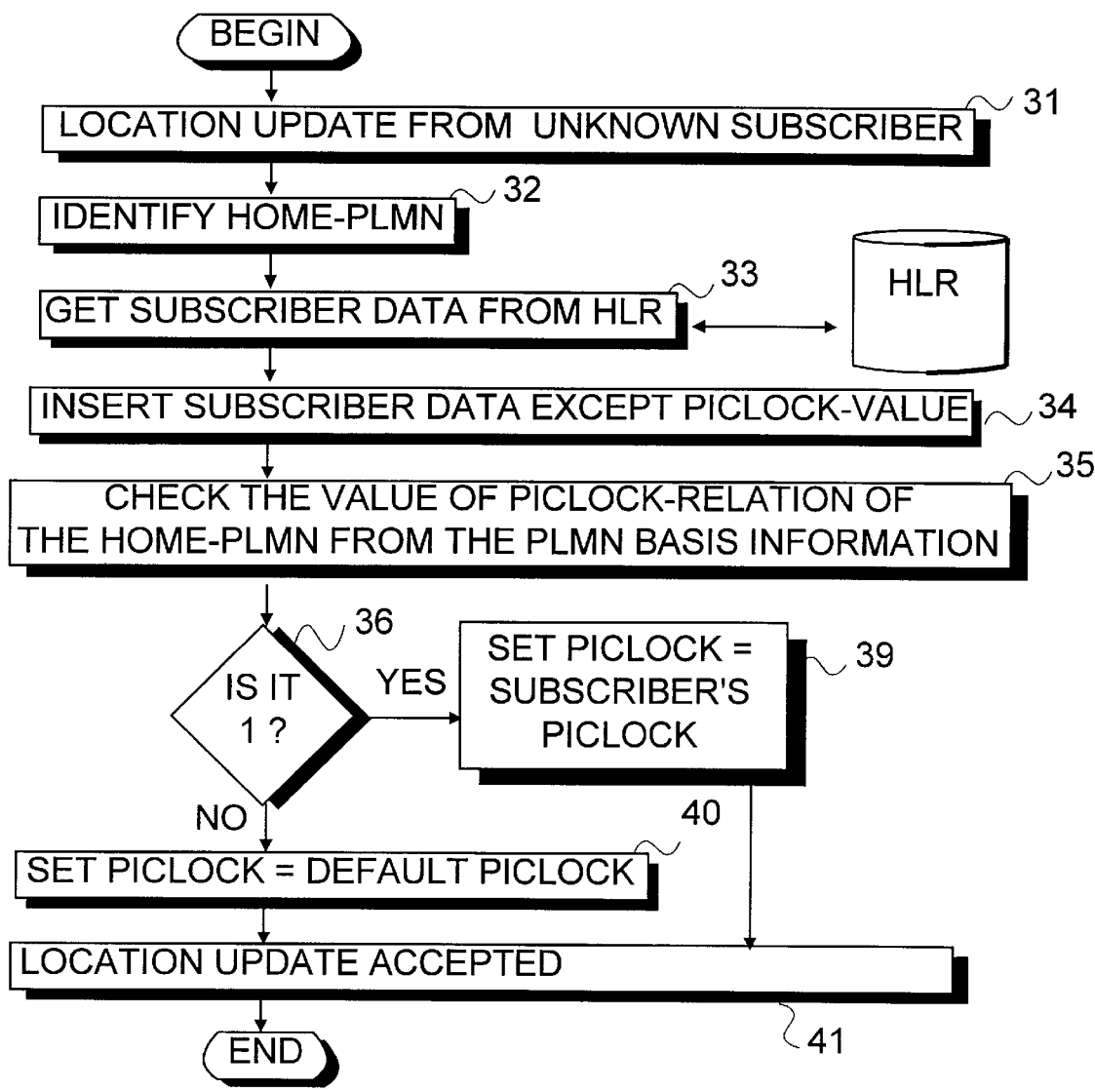
FIG. 4 is a flow diagram illustrating the operation of the visitor location register VLR while inserting the subscriber data concerning PICLOCK value in accordance with a first embodiment of the invention.

The flow diagram of FIG. 4 illustrates how the extension of the subscriber profile may be established and stored in the VRL. It is assumed that the subscriber is a roaming subscriber from a home PCN whose operator has a roaming agreement with the operator of the visited PCN. It should be noted, however, that a similar procedure may be applied to the own subscribers of the visited PCN. It is further assumed that a location updating request from an unknown subscriber is received by the VLR. In other words, the subscriber is currently entering the area of VRL, or the HLR has removed his/her subscriber data from the VRL for one reason or another, for example, since the subscriber profile has been changed, or the VRL has defined the present subscriber data to be erroneous, since the network-specific parameters of the home PCN of the subscriber (i.e. for parameters shown in FIG. 3) has been changed in the VLR by the operator. If the location update request is made by a known subscriber, the subscribers data already existing in the VLR will be used.

With reference to FIG. 4, after receiving the location update request from the unknown subscriber (step 31), the VLR identifies the home PCN of the subscriber from the IMSI or TMSI (Temporary Mobile Subscriber Identity), in step 32, and obtains the subscribers data from the HLR of the identified home PCN. Since the PICLOCK parameter is not a parameter according to the GSM or PCS specifications, the HLR must know whether the PICLOCK parameter can be sent to the VLR. To this end, a PICLOCK support information is added to the VLR data in the HLR. If the VLR is supporting the PICLOCK functionality, the PICLOCK value is transferred via MAP-protocol from the HLR to the VLR. More particularly, the HLR builds up in a normal manner a MAP protocol message (insert subscriber data) which contains the PICLOCK value when this functionality is supported by the VLR. Correspondingly, the MAP-protocol message (delete subscriber data), which removes the subscriber data from the VRL, is built up in a normal way, except that the PICLOCK value is added when the VLR is supporting the PICLOCK functionality.

Upon receiving the subscriber data from the HLR, the VLR stores other subscribers data than the PICLOCK parameter in a normal way, step 34. In order to set the PICLOCK value, the VLR checks the home PCN's PICLOCK relation parameter value stored in the VLR (FIG. 3), steps 35 and 36. If the PICLOCK relation parameter value is 1, the subscriber's PICLOCK will always be used (step 39). If the PICLOCK relation parameter is not 1 in the step 36, the default PICLOCK of the home PCN will always be set as the subscribers PICLOCK (step 40). This different parameter values allow to make various kinds of roaming agreements, to set the PICLOCK for roaming subscribers whose home-PCN does not support the PICLOCK feature, and to handle subscriber with different kinds of subscribers profiles. Particularly, the use of parameter values enable an equitable handling of the subscribers in another embodiment of the invention in which there is a dedicated PICLOCK parameter for each service of the subscriber, the PICLOCK parameter will be set to that the PICLOCK relation parameter is checked independently for each service from the network specific information in the VLR, and the PICLOCK parameter value for the service is set as described above with reference to FIG. 4.

If a default PIC and PIC relation, parameters are set to the home PCN of the subscriber in the VRL, the PIC parameter will be set in a similar manner as the PICLOCK. The PIC parameter may be set either prior to or after setting the PICLOCK parameter. The values of the PIC relation parameter and the PICLOCK relation parameter are independent from each other.

Figure 5:
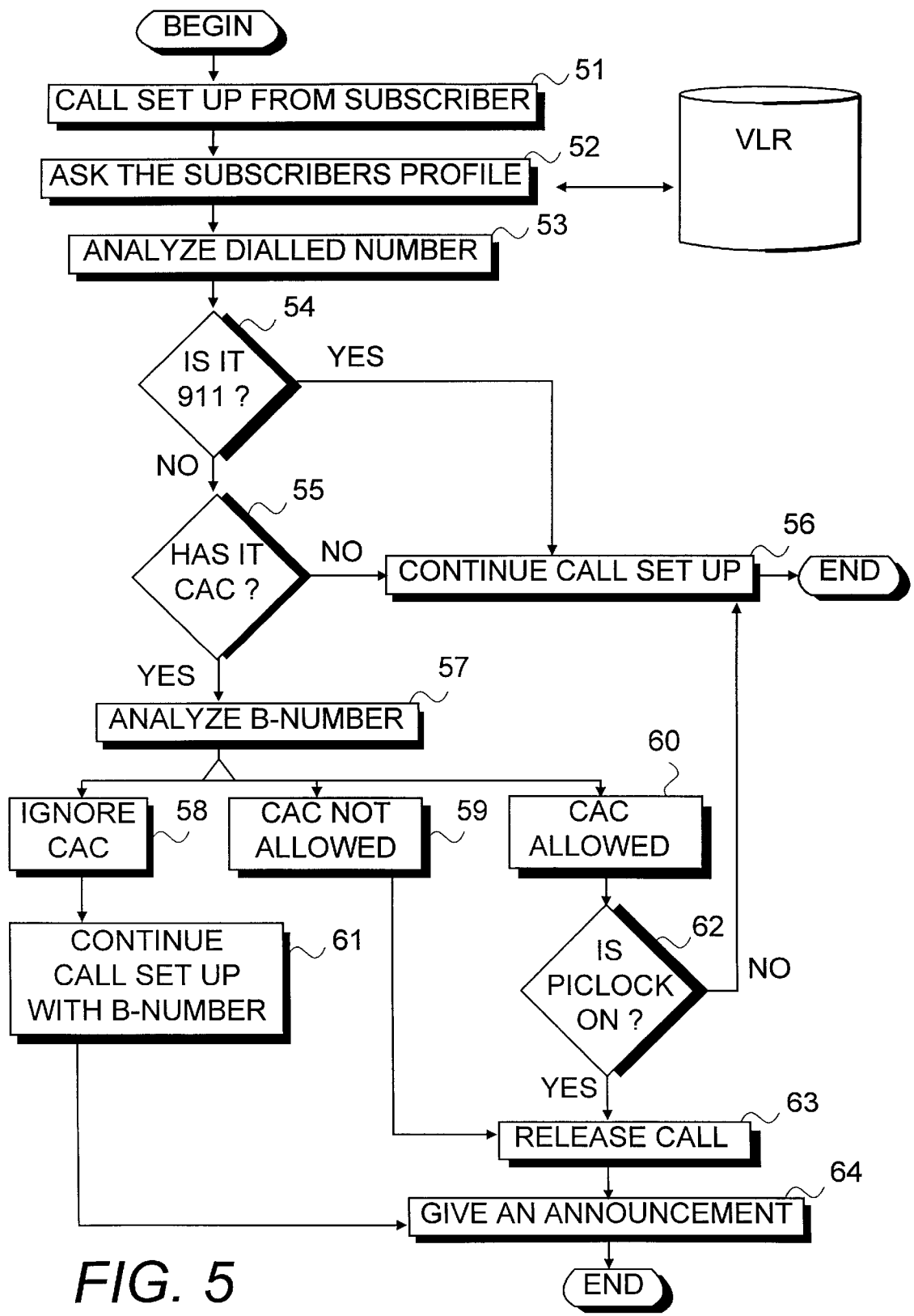
FIG. 5 is a flow diagram illustrating the operation of a personal communications switching center PCSC in a personal station originating call set up according to the first embodiment of the invention.

The flow diagram of FIG. 5 illustrates the operation of the personal communications switching system PCSC for a personal station originating call. After receiving the call set up message from the personal station PS (the subscriber) via the radio system (step 51), the PCSC ask the subscriber profile from the associated VLR (step 52), and begins to analyze the number dialed by the subscriber (step 53). The analyzer first checks if the dialed number is an emergency number, for example 911 (step 54). If the subscriber dials carrier access code CAC with the emergency number, the call will be accepted and the call setup will be continued ignoring the CAC (step 56) although the subscriber had the PICLOCK parameter value ON i.e. he or she is not allowed to dial carrier access code CAC.

If the call is not an emergency call in step 54, the number analyzer checks whether the CAC has been dialled or not (step 55). If the dialed number does not contain any CAC, the call set up will continue normally (step 56).

If the dialled number contains a CAC, the B-number i.e. the destination number, will be analyzed (step 57). The operator may have configured different types of P-numbers which are handled differently from each other in the call set up. The number types may be carrier access code CAC allowed, carrier access code CAC not allowed, and ignore carrier access code CAC. If the B-number analyzes gives the type ignore CAC (step 58), then the PICLOCK will not be checked anf the call set up will continue normally with the B-number without CAC (step 61).

In certain call types, such as 800, 900, N11, local and 00 operator calls, the CAC dialing is not allowed, because the dialled number is not supported with CAC.

In these cases the B-number analyzes gives the type CAC not allowed (step 59). The operator also may configure other calls to this type. If the subscriber dials a carry access code CAC in these call types, the call will be released with the reason code, which tells that the CAC dialling is not allowed (step 63). The reason code analyzer may define an announcement to be given to the calling subscriber (step 64). The announcement may be a voice message or a short message or any other kind of announcement.

Usually the type of the call is CAC allowed (step 60). In this case, it is checked whether the PICLOCK is ON or OFF (step 62). If the PICLOCK is OFF, the call setup will continue normally (step 56). If the PICLOCK is ON, the call will be released with the reason code, which tells that CAC dialing is not allowed (step 63). The reason code analysis may define an announcement to be given to the calling subscriber (step 64). In another embodiment, when the PICLOCK is ON, the number analysis (after step 62) checks whether the dialed CAC is the preferred interexchanged carrier access code. If it is, the call is not released and the call setup will continue normally. If the dialed CAC is not the subscriber's PIC, the call will be released and an announcement will be given.

The flow diagram of FIG. 6 illustrates the use of the inventive PICLOCK parameter in call forwarding activation procedure. In a step 71 the HLR of the subscriber receives a call forwarding activation request from the PS of the subscriber. In step 72 the HLR analyzes the forwarded-to-number in the received call forwarding activation request. If the forward-to-number includes a carrier access code CAC in the step 73, the HLR checks from the subscriber's profile (FIGS. 3A and 3B) whether the PICLOCK parameter is ON or OFF in step 74. If the PICLOCK is ON, the forwarded-to-number is rejected, call forwarding will not be activated and an announcement will be given to the subscriber (steps 76 and 77). It is also possible that the HLR compares subscriber's PIC and dialed CAC, and if they match, the call forwarding will be activated although the PICLOCK parameter is ON. If the forward-to-number does not include a CAC, or the PICLOCK parameter is OFF, the HLR continues call forwarding normally (step 75).

Although the invention has been described with reference to the preferred embodiments of the invention, many alternatives, variations and modifications will be apparent to those of ordinary skilled in the art. Those alternatives, variations and modifications are intended to fall within the spirit and scope of the invention.

We claim:

1. A method of controlling a long distance call setup in a communications system, comprising steps of selecting a preferred long distance carrier applicable to at least some calls when set up in said communication system, determining a locking parameter for a subscriber in a subscriber database by an operator of a home network of said subscriber, said locking parameter defining whether said subscriber is allowed to select the long distance carrier for a call, or not, receiving a destination number dialled by said subscriber during a call setup, in connection with said receiving, checking whether a long distance carrier access code has been dialled by said subscriber during said call setup, if no long distance carrier access code has been dialled by said subscriber during said call setup, continuing said call setup via said preferred long distance carrier, but if a long distance carrier access code has been dialled by said subscriber during said call setup, checking said locking parameter of said subscriber, and deciding on continuation versus termination of said call setup depending on said locking parameter.

2. A method as claimed in claim 1, wherein said step of deciding comprises further steps of continuing the call setup when said locking parameter indicates that said subscriber is allowed to select the long distance carrier, terminating the call setup when said locking parameter indicates that said subscriber is not allowed to select the long distance carrier.

3. A method as claimed in claim 2, comprising the steps of determining first, second and third destination number categories, analyzing said dialled destination number prior to checking said locking parameter, ignoring the dialled long distance carrier access code and continuing the call setup on basis of said dialled destination number, when said dialled destination number belongs to said first category, terminating the call setup when said dialled destination number belongs to said second category, checking said locking parameter when said dialled destination number belongs to said third category.

4. A method as claimed in claim 1, said deciding comprising the steps of continuing the call setup when said said locking parameter indicates that said subscriber is allowed to select the long distance carrier, checking whether said dialled long distance carrier access code matches with said preferred long distance carrier access code, when said locking parameter indicates that said subscriber is not allowed to select the long distance carrier, terminating the call setup when said dialled and preferred long distance carrier access codes do not match, and continuing the call setup via long distance carrier indicated by said preferred long distance carrier access code when said dialled and preferred long distance carrier access codes do not match.

5. A method as claimed in claim 4, said deciding comprising the step of determining first, second and third destination number categories, analyzing said dialled destination number prior to checking said locking parameter, ignoring the dialled long distance carrier access code and continuing the call setup on basis of said dialled destination number when said dialled destination number belongs to said first category, terminating the call setup when said dialled destination number belongs to said second category, and checking said locking parameter when said dialled destination number belongs to said third category.

6. A method as claimed in claim 1, said determining and checking comprising the steps of determining a default locking parameter for said home wireless network in a database of at least one other wireless network, said default locking parameter defining whether subscribers of said home network are allowed to select a long distance carrier for a call or not, receiving, during a call setup in said at least one other wireless network, a long distance carrier access code dialled by said subscriber of said home network visiting in said at least one other wireless network and, checking said default locking parameter of said home wireless network.

7. A method as claimed in claim 1, said determining checking and receiving comprising the steps of determining said locking parameter for said subscriber in said subscriber's home database, determining a default locking parameter for said home wireless network in a subscriber database of at least one other wireless network, said default locking parameter defining whether subscribers of said home wireless network are allowed to select a long distance carrier for a call or not, determining a locking relation parameter for said home wireless network in said subscriber database of said at least first wireless network, said locking relation parameter having a first value or a second value receiving during a call setup in said at least one other wireless network, a long distance carrier access code dialled by said subscriber of said home wireless network visiting in said at least one other wireless network, checking said locking relation parameter of said home wireless network, and deciding on the continuation or the termination of the call setup on basis of
A) said locking parameter of said subscriber always, when said locking relation parameter has said first value,
B) said default parameter always, when said locking relation parameter has said second value.

8. A method as claimed in claim 1 said determining and checking, comprising the steps of determining a default preferred carrier code for said home wireless network in a subscriber database of at least one other wireless network, using said default preferred carrier code for the subscribers of said home wireless network when the subscriber's preferred carrier code is not available or another predetermined criteria is fulfilled.

9. A method as claimed in claim 1, said determining, checking and receiving comprising the steps of determining a default preferred carrier code for said home wireless network in a subscriber database of at least one other wireless network, determining a preferred carrier relation parameter for said home wireless network in said subscriber database of said at least first wireless network, said relation parameter having a first value, a second value or a third value, receiving during a call setup in said at least one other wireless network, a long distance carrier access code dialled by said subscriber of said home wireless network visiting in said at least one other wireless network, checking said relation parameter of said home wireless network, and
A) using said subscriber's preferred carrier access code, if available, when said relation parameter has said first value, B) using said subscriber's preferred carrier access code always, when said relation parameter has said first value, C) using said default carrier access code always, when said relation parameter has said third value.

10. A method as claimed in claim 1, said determining comprising the step of determining dedicated locking parameters for different tele or bearer services of said subscriber.

11. A method of controlling a long distance call setup in a wireless communications system, comprising the step of selecting a new preferred long distance carrier applicable to at least some calls when set up in said communication system, determining a default locking parameter for at least one other wireless network in a database of a first wireless network, said default locking parameter defining whether subscribers of said at least one other wireless network are allowed to select a long distance carrier for a call or not, receiving during a call setup in said first wireless network, a destination number dialled by a subscriber of said at least one other wireless network visiting in said first wireless network, in connection with said receiving, checking whether a long distance carrier access code has been dialled by said subscriber during said call setup, is no long distance carrier access code has been dialled by said subscriber during said call setup, continuing said call setup via said preferred long distance carrier, but if a long distance carrier access code has been dialled by said subscriber during said call setup, checking said default locking parameter of said at least one other wireless network, and deciding on continuation versus termination of said call setup depending on said default locking parameter.

12. A method as claimed in claim 11, wherein said step of deciding comprises further steps of continuing the call setup when said default locking parameter indicates that subscribers of said at least one other wireless network are allowed to select the long distance carrier, terminating the call setup when said default locking parameter indicates that subscribers of said at least one other wireless network are not allowed to select the long distance carrier.

13. A method as claimed in claim 11, said determining, receiving, checking and deciding comprising the steps of determining a locking relation parameter for said at least one other wireless network in said subscriber database of said first wireless network, said locking relation parameter having a first value or a second value, receiving during a call setup in said first wireless network, a long distance carrier access code dialled by a subscriber of said at least one other wireless network visiting in said first wireless network, checking said locking relation parameter of said at least one other wireless network, and deciding on the continuation or the termination of the call setup on basis of A) said locking parameter of said subscriber only, when said locking relation parameter has said first value, B) said default parameter only, when said locking relation parameter has said second value.

14. A method as claimed in claim 13, wherein said step of deciding on the continuation or the termination of the call setup on basis of a locking parameter of said subscriber comprises the further steps of continuing the call setup when said locking parameter indicates that said subscriber is allowed to select the long distance carrier, terminating the call setup when said locking parameter indicates that said subscriber is not allowed to select the long distance carrier.

15. A method as claimed in claim 11 said determining, receiving, checking and deciding, comprising the step of determining a default preferred carrier code for said at least one other wireless network in a subscriber database of said first wireless network, determining a preferred carrier relation parameter for said at least one other wireless network in said subscriber database of said first wireless network, said relation parameter having a first value, a second value or a third value, receiving, during a call setup in said first wireless network, a long distance carrier access code dialled by said subscriber of said at least one other wireless network, checking said relation parameter of said at least one other wireless network, and A) using said subscriber's preferred carrier access code, if available, when said relation parameter has said first value, B) using said subscriber's preferred carrier access code always, when said relation parameter has said first value, C) using said default carrier access code always, when said relation parameter has said third value.

16. A wireless network, comprising at least one mobile subscriber, at least one switching center at least one subscriber data base for storing subscriber data for said mobile subscriber, said subscriber data of said mobile subscriber including a subscriber-specific locking parameter set by an operator of the wireless network, said locking parameter defining whether said subscriber is allowed to select the long distance carrier for a call, or not, said wireless network being arranged to check, in a response to a destination number dialled by said subscriber during a call setup, whether a long distance carrier access code is dialled by said subscriber, and A) to continue the call setup via a predetermined preferred long distance carrier, when no long distance carrier access code is dialled by said subscriber, and B) to check, when a long distance carrier access code is dialled by said subscriber, said locking parameter of said subscriber, in a response to a destination number dialled by said subscriber during a call setup, whether a long distance carrier access code is dialled by said subscriber, and A) to continue the call setup via a predetermined preferred long distance carrier, when no long distance carrier access code is dialled by said subscriber, and B) to check, when a long distance carrier access code is dialled by said subscriber, and to decide on the continuation or the termination of the call setup on basis of said locking parameter.

17. A network as claimed in claim 16, wherein said network is arranged to continue the call setup when said said locking parameter indicates that said subscriber is allowed to select the long distance carrier, and to terminate the call setup when said locking parameter indicates that said subscriber is not allowed to select the long distance carrier.

18. A network as claimed in claim 16, wherein said subscriber data of at said least one subscriber further includes a preferred long distance carrier access code set by the operator, and wherein said wireless network is arranged to A) continue the call setup via a long distance carrier indicated by said preferred long distance carrier access code, when no long distance carrier access code is dialled by said subscriber, B) continue the call setup when a long distance carrier access code is dialled by said subscriber and said locking parameter indicates that said subscriber is allowed to select the long distance carrier, C) terminate the call setup when a long distance code is dialled by said subscriber and said locking parameter indicates that said subscriber is not allowed to select the long distance carrier.

19. A network as claimed in claim 16, wherein said subscriber data of at least one subscriber further includes a preferred long distance carrier access code set by the operator, and wherein said wireless network is arranged to A) continue the call setup via a long distance carrier indicated by said preferred long distance carrier access code, when no long distance carrier access code is dialled by said subscriber, B) continue the call setup when a long distance carrier access code is dialled by said subscriber, and said locking parameter indicates that said subscriber is allowed to select the long distance carrier, and said preferred and dialled long distance carrier access codes do match and, C) terminate the call setup when when a long distance carrier access code is dialled by said subscriber, and said locking parameter indicates that said subscriber is not allowed to select the long distance carrier, and said preferred and dialled long distance carrier access codes do not match.

20. A network as claimed in claim 19, wherein said visitor data base is arranged to store a network-specific default preferred carrier access code for at least one other wireless network, and to use said default preferred carrier access code when the subscriber's preferred carrier code is not available or another predetermined criteria is fullfilled.

21. A network as claimed in claim 19, wherein said visitor data base is arranged to store a network-specific default preferred carrier access code and a network-specific preferred carrier relation for at least one other wireless network, said relation parameter having a first value, a second value or a third value, said wireless network being responsive to receiving, during a call setup, a long distance carrier access code dialled by said subscriber of said at least one wireless network visiting within said service area, for said relation parameter of said at least one other wireless network, and for A) using said subscriber's preferred carrier access code, of available, when said relation parameter has said first value, B) using said subscriber's preferred carrier access code always, when said relation parameter has said first value, C) using said default carrier access code always, when said relation parameter has said third value.

22. A network as claimed in claim 16, wherein said at least one subscriber data base comprises a home data base and at least one visitor data base, and wherein said subscriber data including said locking parameter is permanently stored in said home data base, and wherein a copy of said subscriber data including said locking parameter is temporarily stored in said at least one visitor data base when said subscriber is located within the service area of said at least visitor data base.

23. A network as claimed in claim 22, wherein said visitor data base is arranged to store a network-specific default locking parameter for at least one other wireless network, said default locking parameter defining whether subscribers of said at least one other wireless network are allowed to select a long distance carrier for a call or not, said wireless network is responsive to receiving a long distance carrier access code dialled during a call setup by said subscriber of at least one other wireless network visiting in within said service area, for checking said default locking parameter of said at least one other wireless network, and for A) continuing the call setup when said default locking parameter indicates that subscribers of said at least one other wireless network are allowed to select the long distance carrier, or B) terminating the call setup when said default locking parameter indicates that subscribers of said at least one other wireless network are not allowed to select the long distance carrier.

24. A network as claimed in claim 22, wherein said visitor data base is arranged to store a network-specific default locking parameter and a network-specific locking relation parameter for at least one other wireless network, said default locking parameter defining whether subscribers of said at least one other wireless network are allowed to select a long distance carrier for a call or not, and said locking relation parameter having a first value or a second value, said wireless network being responsive to receiving a long distance carrier access code dialled during a call setup by said subscriber of at least one other wireless network visiting in within said service area, for checking said locking relation parameter of said at least one other wireless network, and for deciding on the continuation or the termination of the call setup on basis of A) said locking parameter of said subscriber only, when said locking relation parameter has said first value, C) said default locking parameter only, when said locking relation parameter has said second value.

25. A wireless network, comprising at least one switching center, a home subscriber data base, a visitor subscriber data base for temporarily storing subscriber data for mobile subscribers of at least one other wireless network visiting in the service area of the visitor data base, said visitor subscriber data base being arranged to further store a network-specific default locking parameter for said at least one other wireless network, said said default locking parameter defining whether subscribers of said at least one other wireless network are allowed to select a long distance carrier for a call, or not, said wireless network being arranged to check in response to a destination number dialled by a subscriber of said at least one other wireless network during a call setup, whether a long distance carrier access code dialled by said subscriber of said at least one other wireless network during said call setup, and
- A) to continue the call setup via a predetermined preferred long distance carrier, when no long distance carrier access code is dialled by said subscriber, or
- B) to check said default locking parameter of said subscriber said at least one other wireless network, when a long distance carrier access code is dialled by said subscriber, and decide on continuation or termination of the call setup in basis of said default locking parameter.

26. A wireless network as claimed in claim 25, wherein said visitor subscriber data base being arranged to further store a network-specific locking relation parameter for said at least one other wireless network, said locking relation parameter having a first value, a second value or a third value, said visitor subscriber data base being responsive to a long distance carrier access code dialled by a subscriber of said at least one other wireless network during a call setup, for causing the continuation or the termination of the call setup in basis of
- A) a locking parameter of said subscriber, if received from said at least one other wireless network with other subscriber data, and on basis of said default locking parameter otherwise, when said locking relation parameter has said first value,
- B) said locking parameter of said subscriber only, when said locking relation parameter has said second value,
- C) said default parameter only, when said locking relation parameter has said third value.

27. A method of controlling a call forwarding activation in a wireless communications system, comprising the steps of determining a locking parameter for a subscriber in a subscriber database by an operator of a wireless home network of said subscriber, said locking parameter defining whether said subscriber is allowed to select the long distance carrier for the call or not, receiving a forwarded-to-number from said subscriber during a call forwarding activation, checking whether a long distance carrier access code is in said forwarded-to-number, and
- A) continuing the call forwarding activation when no long distance carrier code is in forwarded-to-number, and
- B) checking said locking parameter of said subscriber when a long distance carrier access code is in forwarded to number, and
  - (B1) continuing the call forwarding activation when the said locking parameter indicates that said subscriber is allowed to select the long distance carrier, or
  - (B2) rejecting the call forwarding activation when the said locking parameter indicates that said subscriber is not allowed to select the long distance carrier.

* * * * *